(12) United States Patent
Watari et al.

(10) Patent No.: US 8,395,999 B2
(45) Date of Patent: Mar. 12, 2013

(54) REAL-TIME DETECTION OF FAILED INTER-NODE LINK IN NETWORK

(75) Inventors: Masafumi Watari, Saitama (JP); Atsuo Tachibana, Saitama (JP); Shigehiro Ano, Saitama (JP)

(73) Assignee: KDDI Corporation, Tokyo (JP)

( * ) Notice: Subject to any disclaimer, the term of this patent is extended or adjusted under 35 U.S.C. 154(b) by 387 days.

(21) Appl. No.: 12/876,630

(22) Filed: Sep. 7, 2010

(65) Prior Publication Data

US 2011/0058488 A1  Mar. 10, 2011

(30) Foreign Application Priority Data

Sep. 8, 2009  (JP) ................................ 2009-207516
Feb. 4, 2010  (JP) ................................ 2010-023066

(51) Int. Cl.
*G01R 31/08* (2006.01)

(52) U.S. Cl. ........ 370/244; 370/217; 370/221; 370/225; 714/2; 714/25

(58) Field of Classification Search .......... 370/242–245, 370/217–228; 714/2–46
See application file for complete search history.

(56) References Cited

U.S. PATENT DOCUMENTS

2005/0201274 A1* 9/2005 Guerin et al. ................. 370/217

2006/0171331 A1* 8/2006 Previdi et al. ................. 370/254

OTHER PUBLICATIONS

Feldmann et al., "Locating Internet Routing Instabilities," SIGCOMM, 2004.
Lad et al., "Inferring the Origin of Routing Changes using Link Weights," IEEE ICNP, 2007.
Campisano et al., "Tracking Back the Root Cause of a Path Change in Interdomain Routing," IEEE Network Operations and Management Symposium, 2008.

* cited by examiner

*Primary Examiner* — Hoon J Chung
(74) *Attorney, Agent, or Firm* — Oliff & Berridge, PLC

(57) ABSTRACT

A method is disclosed of detecting a failed link in a network over which nodes are interconnected via links. The nodes include an observer node and a managed node. This method, implemented for the observer node, includes: determining, for each of prefixes in receive route-update messages, a single normal-state path; determining, for each of the links (i.e., monitored links) on the normal-state path for the managed node, at least one prefix advertised from one of the nodes which is located adjacent to the each link on an upstream side, as at least one monitored prefix; determining whether the path contained in each route-update message, and the normal-state path for the monitored prefix contained in the each route-update message are unmatched with each other; counting, for each monitored link, an unmatched-prefix count which refers to a count of at least one unmatched prefix of the at least one monitored prefix for each monitored link; and extracting at least one link from the monitored links, as at least one failed link, based on the unmatched-prefix count.

11 Claims, 10 Drawing Sheets

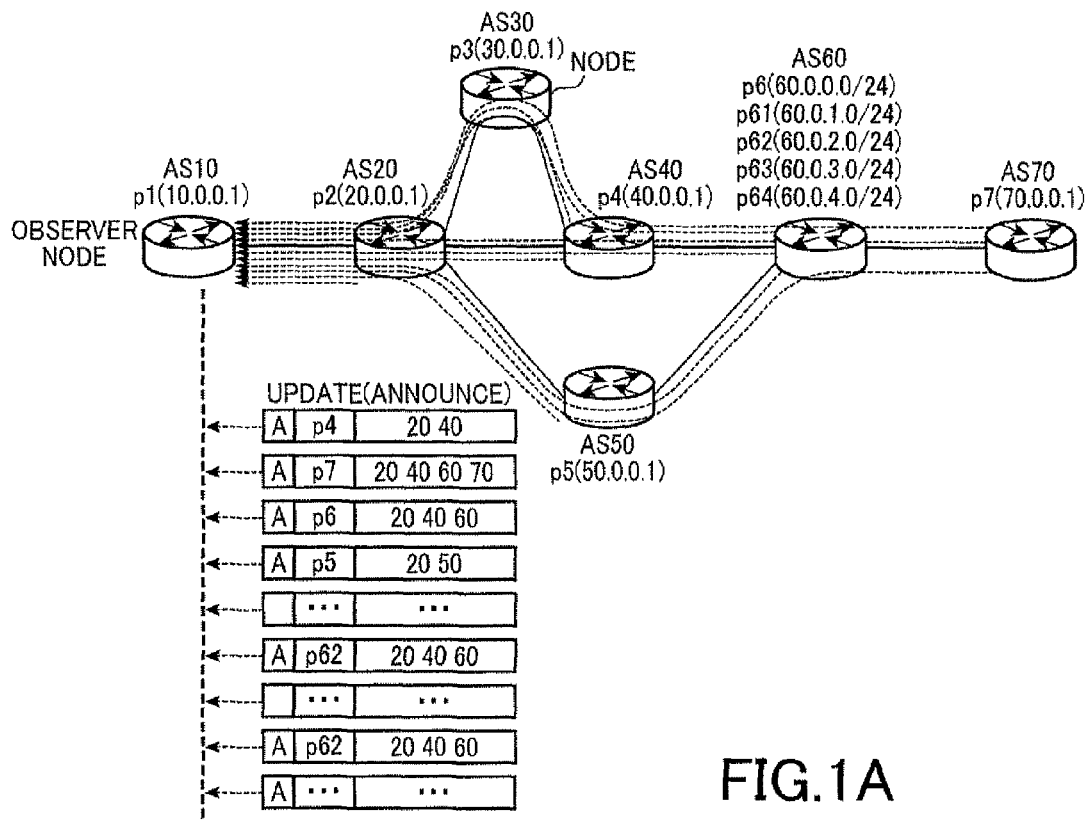

COUNTING OF UNMATCHED-PREFIX COUNT

| LINK | 10-20 | 20-40 | 40-60 | 60-70 |
|---|---|---|---|---|
| MONITORED-PREFIX | p2 | p4 | p6<br>p61<br>p62<br>p63<br>p64 | p7 |
| PER-LINK TOTAL MONITORED-PREFIX NUMBER | 1 | 1 | 5 | 1 |
| POINT OF TIME FOR OBSERVATION T1 | 0 | 0 | 0 | 0 |
| POINT OF TIME FOR OBSERVATION T2 | 0 | 0 | 5 | 1 |

UNMATCHED-PREFIX COUNT = PER-LINK TOTAL MONITORED-PREFIX NUMBER
5 = 5
LINK [40-60] IS DETERMINED AS FAILED-LINK CANDIDATE.

UNMATCHED-PREFIX COUNT = PER-LINK TOTAL MONITORED-PREFIX NUMBER
1 = 1
LINK [60-70] IS DETERMINED AS FAILED-LINK CANDIDATE.

LINK [40-60] IS CLOSER TO OBSERVER NODE AS10 THAN LINK [60-70].

IT IS ESTIMATED THAT LINK [40-60] HAS BEEN FAILED.

FIG.4A

COUNTING OF UNMATCHED-PREFIX COUNT

| LINK | 10-20 | 20-40 | 40-60 | 60-70 |
|---|---|---|---|---|
| MONITORED-PREFIX | p2 | p4 | p6<br>p61<br>p62<br>p63<br>p64 | p7 |
| PER-LINK TOTAL MONITORED-PREFIX NUMBER | 1 | 1 | 5 | 1 |
| POINT OF TIME FOR OBSERVATION  T1 | 0 | 0 | 0 | 0 |
| POINT OF TIME FOR OBSERVATION  T2 | 0 | 0 | 3 | 1 |

UNMATCHED-PREFIX COUNT = PER-LINK TOTAL MONITORED-PREFIX NUMBER
3 = 5
DIFFERENCE RATIO=3/5=60% THRESHOLD RATIO 50%
LINK [40-60] IS DETERMINED AS FAILED-LINK CANDIDATE.

UNMATCHED-PREFIX COUNT = PER-LINK TOTAL MONITORED-PREFIX NUMBER
1 = 1
LINK [60-70] IS DETERMINED AS FAILED-LINK CANDIDATE.

LINK [40-60] IS CLOSER TO OBSERVER NODE AS10 THAN LINK [60-70].

IT IS ESTIMATED THAT LINK [40-60] HAS BEEN FAILED.

FAILURE-OCCURRENCE PROBABILITY = 60%

FIG.4B

REAL-TIME DETECTION OF FAILED INTER-NODE LINK IN NETWORK

CROSS-REFERENCE TO RELATED APPLICATIONS

The present application is based on and claims the benefit of priority from Japanese Patent Application No. 2009-207516 filed Sep. 8, 2009, and Japanese Patent Application No. 2010-023066 filed Feb. 4, 2010, the contents of which are incorporated herein by reference in their entirety.

BACKGROUND OF THE INVENTION

1. Field of the Invention

The invention relates generally to techniques of allowing real-time detection of failed inter-node links in a communication network running a specific routing protocol.

2. Description of the Related Art

Over the Internet, nodes (e.g., routers) relay packets to other nodes, according to a pre-defined routing protocol. A representative routing protocols for exchanging routing information (network reachability) among different network domains within the Internet is called BGP (Border Gateway Protocol). A domain in BGP is called AS (Autonomous System). Each domain is assigned an AS (Autonomous System) number which is unique within the Internet. Nodes within each domain are allocated the same AS number, often sharing the same routing policy under the control of the same network operator(s). Each AS number, traditionally in two bytes (but currently, shifting to four bytes), is assigned by IANA (Internet Assigned Numbers Authority).

FIG. 1A illustrates the configuration of an exemplary network using BGP, and FIG. 1B illustrates the routing table created in such network.

As illustrated in FIG. 1A, each node is allocated a unique AS number are connected using BGP. Each node creates and sends to neighboring nodes in a broadcast manner, one or more UPDATE messages containing to advertise the reachability of one or more destination prefixes (i.e., the destination network-address). Each UPDATE message includes the following parameters:

(1) Type of Message,
(2) List of Prefix(es)
(3) AS_PATH Attribute (Only for Announce messages).

The "Type of Message" refers to the type of the UPDATE message (i.e., A: announce message for advertising feasible prefixes, or W: withdraw message for withdrawing unfeasible prefixes).

The "List of Prefix(es)" implies the list of prefixes that are either announced or withdrawn, where a "prefix" refers to a combination of a network address and a subnet mask (xxx.xxx.xxx.xxx/xx).

The "AS_PATH Attribute" refers to the AS path used to reach the prefix, denoted by a sequence of AS numbers.

On receiving an UPDATE (Announce) message, each node adds its own AS number to the AS_PATH Attribute of the received UPDATE (Announce) message, and relays the modified UPDATE (Announce) message to its neighbors.

Each node maintains the list of prefixes and its AS paths in a routing table, called "RIB (Routing Information Base)." FIG. 1B illustrates an example routing table created at AS10 of FIG. 1A. The sequence of AS numbers for each prefix indicate the ASes to traverse before reaching that prefix. The routing table is updated each time a new UPDATE message is received for each prefix.

A known technique for detecting a failed link within such network analyzes the correlation of the AS paths of prefixes observed very close in time. This technique is disclosed in, for example, "A. Feldmann, O. Maennel, Z. Mao, A. Berger, and B. Maggs, "Locating Internet Routing Instabilities," SIGCOMM 2004."

This technique would allow network operators to estimate one or more links as the location of the failure using the prefixes that were observed during the evaluation period.

Another known technique extracts inter AS links from the AS paths attribute of each prefix, and, as illustrated in FIG. 1C, calculate the number prefixes that are used by each link. This technique is disclosed in, for example, "M. Lad, R. Oliveira, D. Massey, and L. Zhang, "Inferring the Origin of Routing Changes using Link Weights," IEEE ICNP 2007," and "A. Campisano, L. Cittadini, G. Di Battista, T. Refice, and C. Sasso, "Tracking Back the Root Cause of a Path Change in Interdomain Routing," IEEE Network Operations and Management Symposium, 2008."

This technique would allow network operators to measure the number prefixes gained or lost at each link, and estimate the link that loses all prefixes (or the number of lost prefixes is more than the predefined threshold) as the location of failure.

BRIEF SUMMARY OF THE INVENTION

The first known technique relies on two sets of routing tables for estimating the location of link failures; the routing table created before the failure and the routing table created after the failure. In the actual Internet, however, identifying the two routing tables is nearly impossible as routing changes occur very frequently. The disclosed technique thus collects routing tables periodically at constant intervals and compares changes against two consecutive routing tables. Because these routing tables does not always represent the routing table of that created before and after the failure, the accuracy of the technique is low. This technique suffers from additional drawbacks that, if two or more links fail simultaneously at close locations, the correlation using the AS path information may result in false positive inference of link failure. In addition, short lasting failures that occur and recover within the measurement interval are not detected.

In contrast, the second known technique focuses on the number of prefixes used by each link from UPDATE messages observed at the monitor. The disclosed technique compares the number of prefixes used by each link periodically at constant intervals.

The two techniques rely on a given interval for analyzing the routing changes which indicate that a certain amount of time is required before being able to detect link failure. This "interval" or "certain amount of time" refers to, practically, the amount of time required for BGP to converge in the Internet. This time is said to be about 2-3 minutes today. Therefore, with these techniques, estimation of the location of failure cannot be achieved in real-time.

In view of the foregoing, it would be desirable to detect failed links in a network in real-time, without modifying any sequence or any procedure in processing UPDATE messages in the conventional routing protocol.

BRIEF SUMMARY OF THE INVENTION

According to a first aspect of the invention, a method is provided of detecting a failed link in a network where multiple nodes are connected with one another via inter-node links.

In the network, the nodes send/receive route-update messages to their neighbors, in accordance with a pre-selected routing protocol, each node sends in a broadcast manner, a route-update message containing a prefix and a unique node number of the each node, each node, upon receiving a route-update message, transfers the received route-update message after adding the unique node number of the each node to a path represented by a sequence of unique node numbers contained in the received route-update message, wherein the path was used for the same route-update message to be transferred to the each node, and one of the nodes is selected as an observer node, and another is selected as a managed node.

This method, which is implemented for the observer node, includes:

a first step of determining, for the prefix of the managed node, a single normal-state path which it is in a normal state, out of the paths contained in the received route-update messages containing the same prefix;

a second step of determining, for each of the links on the normal-state path determined for the prefix of the managed node, at least one prefix advertised from one of the nodes which is located adjacent to the each link on an upstream side, as at least one monitored prefix, wherein the links on the normal-state path determined for the prefix of the managed node are referred to as monitored links, each of the monitored links corresponds to at least one monitored prefix, and a total number of the at least one monitored prefix for each monitored link is referred to as a per-link total monitored-prefix number;

a third step of selecting ones of the received route-update messages which contain the monitored prefixes determined for the nodes;

a fourth step of determining, for each of the selected route-update messages, whether the path contained in the each selected route-update message is unmatched with the normal-state path determined for the monitored prefix contained in the each selected route-update message;

a fifth step of counting, for each of the monitored links, an unmatched-prefix count which refers to a count of at least one unmatched prefix of the at least one monitored prefix for the each monitored link, wherein the at least one unmatched prefix occurs when at least one of the selected route-update messages which contains the same prefix as the at least one unmatched prefix does not contain the same link as the each monitored link;

a sixth step of extracting at least one link from the monitored links, as at least one failed link, based on a relationship (e.g., a difference, a ratio, or the like) between the unmatched-prefix count and the per-link total monitored-prefix number for the at least one monitored link; and a seventh step of determining, when a count of the extracted at least one failed link is two or more, one of the extracted two or more failed links, which is closer to the observer node on the normal-state path determined for the managed node, than any other failed link or links.

According to a second aspect of the invention, an apparatus is provided for detecting a failed link in a network where multiple nodes are connected with one another via inter-node links.

In the network, the nodes send/receive route-update messages to their neighbors, in accordance with a pre-selected routing protocol, each node sends in a broadcast manner, a route-update message containing a prefix and a unique node number of the each node, each node, upon receiving a route-update message, transfers the received route-update message after adding the unique node number of the each node to a path represented by a sequence of unique node numbers contained in the received route-update message, wherein the path was used for the same route-update message to be transferred to the each node, and one of the nodes is selected as an observer node, and another is selected as a managed node.

This apparatus, which is implemented for the observer node, includes:

a normal-state path determination unit configured to determine, for the prefix of the managed node, a single normal-state path which it is in a normal state, out of the paths contained in the received route-update messages containing the same prefix;

a monitored-prefix determination unit configured to determine, for each of the links on the normal-state path determined for the prefix of the managed node, at least one prefix advertised from one of the nodes which is located adjacent to the each link on an upstream side, as at least one monitored prefix, wherein the links on the normal-state path determined for the prefix of the managed node are referred to as monitored links, each of the monitored links corresponds to at least one monitored prefix, and a total number of the at least one monitored prefix for each monitored link is referred to as a per-link total monitored-prefix number;

a monitored-message extractor configured to select ones of the received route-update messages which contain the monitored prefixes determined for the nodes;

a path-unmatch determination unit configured to determine, for each of the selected route-update messages, whether the path contained in the each selected route-update message is unmatched with the normal-state path determined for the monitored prefix contained in the each selected route-update message;

an unmatched-prefix counter configured to count, for each of the monitored links, an unmatched-prefix count which refers to a count of at least one unmatched prefix of the at least one monitored prefix for the each monitored link, wherein the at least one unmatched prefix occurs when at least one of the selected route-update messages which contains the same prefix as the at least one unmatched prefix does not contain the same link as the each monitored link;

an unmatched-link extractor configured to extract at least one link from the monitored links, as at least one failed link, based on a relationship (e.g., a difference, a ratio, or the like) between the unmatched-prefix count and the per-link total monitored-prefix number for the at least one monitored link; and a failed-link determination unit configured to determine, when a count of the extracted at least one failed link is two or more, one of the extracted two or more failed links, which is closer to the observer node on the normal-state path determined for the managed node, than any other failed link or links.

It is noted here that, as used in this specification, the singular form "a," "an," and "the" include plural reference unless the context clearly dictates otherwise. It is also noted that the terms "comprising," "including," and "having" can be used interchangeably.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings:

FIG. 1A is a view for illustrating a typical configuration of a network on which UPDATE messages are exchanged between nodes according to BGP, FIG. 1B is a view for illustrating a path table for use in the BGP routing, and FIG. 1C is a view for illustrating a link table used in known techniques;

FIG. 4A is a view for illustrating how to detect a failed link by execution of the method according to the first embodiment;

FIG. 4B is a view for illustrating how to detect a failed link by execution of a real-time failure detection method according to a second illustrative embodiment of the present invention;

DETAILED DESCRIPTION OF THE INVENTION

Figure 2A:
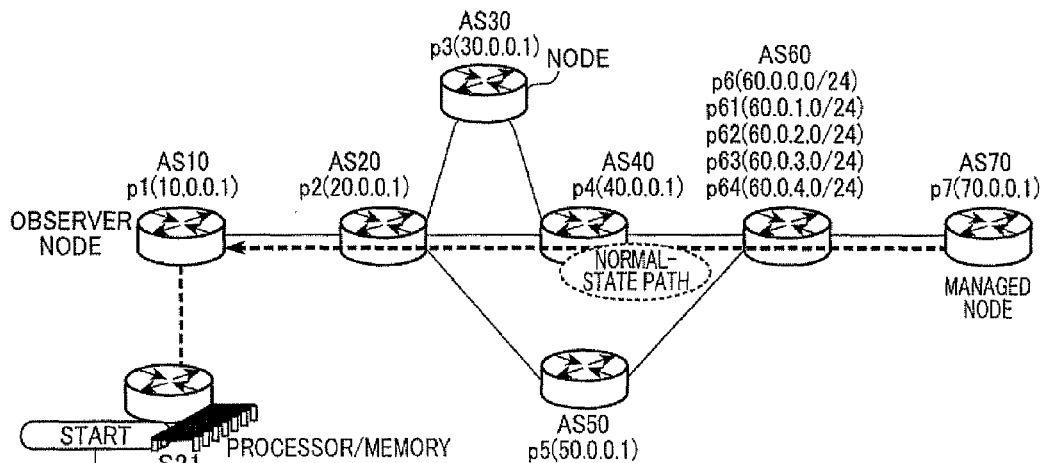
FIG. 2A is a view for illustrating a network for which a real-time failure detection method is implemented which is constructed according to a first illustrative embodiment of the present invention.

According to the invention, the following modes are provided as illustrative embodiments of the invention.

According to a first mode of the invention, there is provided the method according to the first aspect of the invention, wherein the sixth step includes a sub-step of extracting at least one of the monitored links, which has a prefix-difference ratio equal to or higher than a predetermined ratio, as the at least one failed link, wherein the prefix-difference ratio is defined as, $$\text{Prefix-difference ratio} = \text{Unmatched-prefix count}/\text{Per-link total monitored-prefix number}.$$

According to a second mode of the invention, there is provided the method according to the first mode, wherein the seventh step includes a sub-step of determining that the extracted at least one failed link has a failure occurrence probability defined as, $$\text{Failure occurrence probability} = \text{Unmatched-prefix count}/\text{Per-link total monitored-prefix number}.$$

According to a third mode of the invention, there is provided the method according to the second mode, wherein the first step includes a sub-step of calculating, for each prefix, total spent-time lengths of the paths contained in ones of the received UPDATE messages which contain the same prefix as the each prefix, and selecting, for each prefix, one of the paths which has a longer total spent-time length than any other path or paths, as the normal-state path, wherein each total spent-time length indicates a total length of one or more time periods during which the same path was used within a predetermined time range.

According to a fourth mode of the invention, there is provided the method according to any one of the first aspect and the first through third modes, wherein the routing protocol is BGP (Border Gateway Protocol), each unique node number is an AS (Autonomous System) number, each route-update message is a BGP UPDATE (Announce) message, each prefix indicates a source address or its range in a combination of an IP address and a bit count of a subnet mask of each node, and the path for each prefix is contained in an AS_PATH Attribute of one of the UPDATE messages which contains the each prefix.

According to a fifth mode of the invention, there is provided the apparatus according to the second aspect, wherein the unmatched-link extractor includes a sub-extractor for extracting at least one of the monitored links, which has a prefix-difference ratio equal to or higher than a predetermined ratio, as the at least one failed link, wherein the prefix-difference ratio is defined as, $$\text{Prefix-difference ratio} = \text{Unmatched-prefix count}/\text{Per-link total monitored-prefix number}.$$

According to a sixth mode of the invention, there is provided the apparatus according to the fifth mode, wherein the failed-link determination unit includes a sub-unit for determining that the extracted at least one failed link has a failure occurrence probability defined as, $$\text{Failure occurrence probability} = \text{Unmatched-prefix count}/\text{Per-link total monitored-prefix number}.$$

According to a seventh mode of the invention, there is provided the apparatus according to the sixth mode, wherein the normal-state path determination unit includes a sub-unit for calculating, for each prefix, total spent-time lengths of the paths contained in ones of the received UPDATE messages which contain the same prefix as the each prefix, and selecting, for each prefix, one of the paths which has a longer total spent-time length than any other path or paths, as the normal-state path, wherein each total spent-time length indicates a total length of one or more time periods during which the same path was used within a predetermined time range.

According to an eighth mode of the invention, there is provided the apparatus according to anyone of the second aspect and the fifth through seventh modes, wherein the routing protocol is BGP (Border Gateway Protocol), each unique node number is an AS (Autonomous System) number, each route-update message is a BGP UPDATE (Announce) message, each prefix indicates a source address or its range in a combination of an IP address and a bit count of a subnet mask of each node, and the path for each prefix is contained in an AS_PATH Attribute of one of the UPDATE messages which contains the each prefix.

According to a ninth mode of the invention, there is provided a computer-readable non-transitory storage medium having stored therein a program, when executed by a computer, to implement the method according to any one of the first aspect and the first through fourth modes.

The "computer-readable non-transitory storage medium" may be realized in any one of a variety of types, including a magnetic recording medium, such as a flexible-disc, an optical recording medium, such as a CD and a CD-ROM, an optical-magnetic recording medium, such as an MO, an unremovable storage, such as a ROM, for example.

Several presently preferred embodiments of the invention will be described in more detail by reference to the drawings in which like numerals are used to indicate like elements throughout.

First Illustrative Embodiment

Figures 2B, 2C:
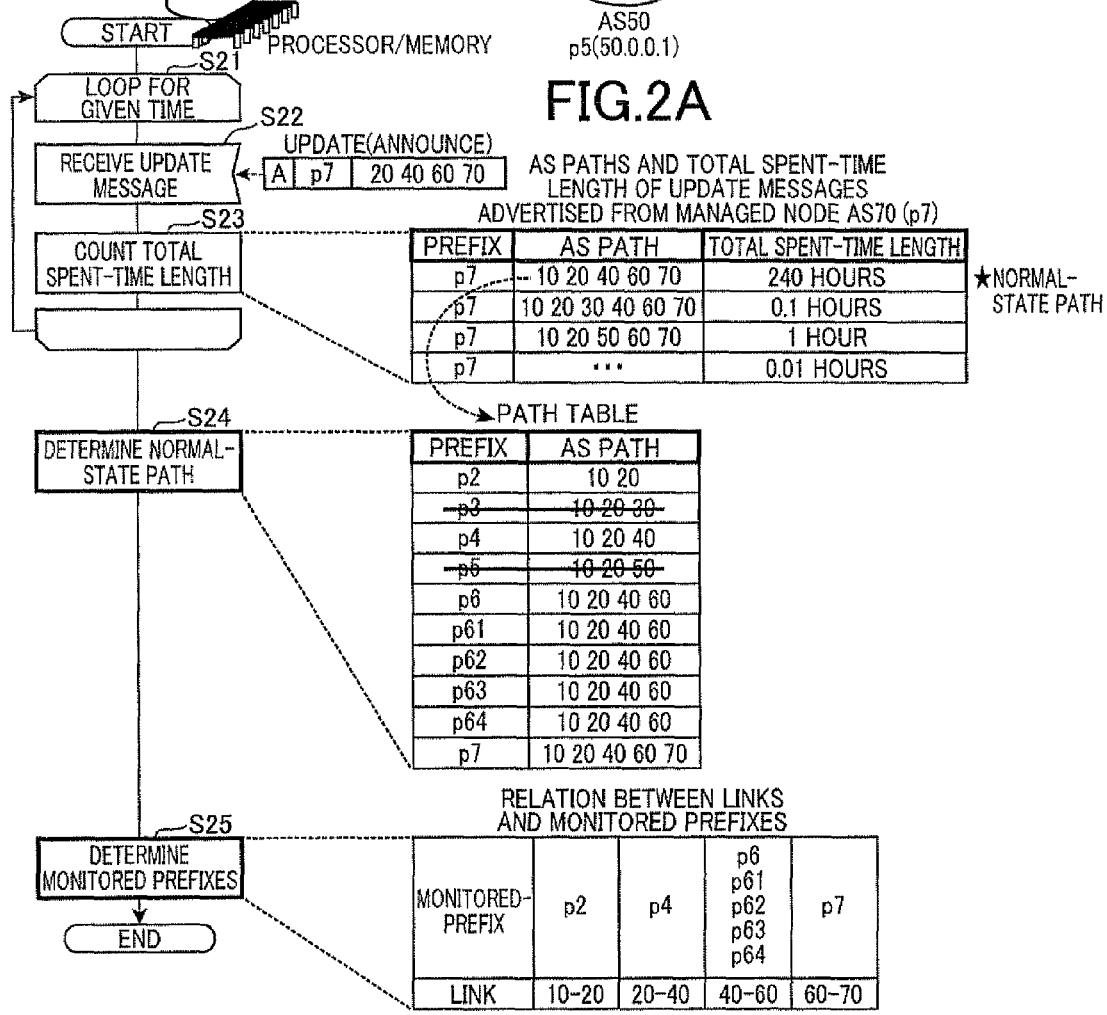
FIG. 2B is a flow chart for illustrating a program executed by a processor using a memory for implementing the method.
FIG. 2C is a view for illustrating tables for implementing the method.

Referring now to FIGS. 2A, 2B and 2C, there is illustrated a real-time failure detection method of detecting, locating or estimating a failed link in a network, according to a first illustrative embodiment of the present invention. FIG. 2A illustrates the configuration of an exemplary network over which a plurality of nodes are interconnected, FIG. 2B illustrates in flow chart a first portion of the real-time failure detection method which is implemented at an observer node elaborated below, and FIG. 2C illustrates tables for use in implementation of the first portion of the real-time failure detection method.

The network illustrated in FIG. 2A has the same configuration as the conventional network illustrated in FIG. 1A. The observer node is a pre-selected one of the nodes, the configuration of which will be described in more detail below in reference with FIG. 9. Typically, the observer node is selected to be located at an edge of the network.

Over the network, seven (7) nodes which have been assigned AS numbers (AS10-AS70) are interconnected according to BGP. Like other nodes, a managed node AS70 creates and sends an UPDATE message (i.e., an exemplary route-update message or routing information) to the observer node AS10 through intervening nodes, in a conventional sequence which will be described below. The managed node AS70 is a pre-selected one of the nodes, and, typically, is selected to be located another edge of the same network.

In the conventional sequence, the managed node AS70, when acting as a source node, repeatedly sends an UPDATE (Announce) message [A|p7|70] which contains its own prefix "p7" and its own AS number "70," in a broadcast manner, via intervening nodes, and finally the message is received by the observer node AS10.

The node AS60, on receiving the UPDATE message from the managed node AS70, adds or prepends its own AS number "60" to the AS path of the received UPDATE message, and relays the modified UPDATE (Announce) message [A|p7|60 70] to the nodes AS40 and AS50.

The node AS40, on receiving the UPDATE message from the node AS60, adds or prepends its own AS number "40" to the AS path of the received UPDATE message, and relays the modified UPDATE (Announce) message [A|p7|40 60 70] to the nodes AS30 and AS20.

The node AS50, on receiving the UPDATE message from the node AS60, adds or prepends its own AS number "50" to the AS path of the received UPDATE message, and relays the modified UPDATE (Announce) message [A|p7|50 60 70] to the node AS20.

The node AS30, on receiving the UPDATE message from the node AS40, adds or prepends its own AS number "30" to the AS path of the received UPDATE message, and relays the modified UPDATE (Announce) message [A|p7|30 40 60 70] to the node AS20.

The node AS20, on receiving the UPDATE message from the node AS30, AS40 or AS50, adds or prepends its own AS number "20" to the AS path of the received UPDATE message, and relays the modified UPDATE (Announce) message [A|p7|20 30 40 60 70], [A|p7|20 40 60 70] or [A|p7|20 50 60 70] to the observer node AS10.

The observer node AS10, on receiving the UPDATE message from the node AS20, adds or prepends its own AS number "10" to the AS path of the received UPDATE message, and stores the modified UPDATE (Announce) message in the path table (or a routing table) as illustrated in FIG. 1B.

In the same sequence as described above, each of the other nodes AS60, AS50, AS40, AS30 and AS20, when acting as a source node, creates and sends an UPDATE message repeatedly in a broadcast manner via the intervening nodes, and finally the message is received by the observer node AS10.

Processing performed at the observer node AS10 will be described with reference to a flow chart of FIG. 2B.

(S21) First, the observer node AS10 repeats execution of the following steps S22 and S23 for a predetermined duration, to thereby determine a normal-state path when it is assumedly before a failure occurs, in the manner described below.

(S22) The observer node AS10 receives a BGP UPDATE (Announce) message, and extracts a prefix and an AS path from the received UPDATE message. The prefix, which indicates a source network address, is expressed as a combination of an IP address and a bit count of a subnet mask.

(S23) The observer node AS10 calculates and stores total spent-time lengths of AS paths contained in the received UPDATE messages, for the respective prefixes of the source nodes contained in the received UPDATE messages. Each total spent-time length indicates a total length of one or more time periods during which the same AS path was used within a predetermined time range.

In an example of FIG. 2C, the node AS70 is pre-selected as a managed node (i.e., anode to be managed or monitored), as described above, and the total spent-time lengths of the AS paths which share the prefix "p7" and which were advertised by the managed node AS70, are stored, on a per-AS-path basis, as illustrated in FIG. 2C.

(S24) The observer node AS10 selects, for a prefix of a particular node acting as a source node, one of AS paths that were used by the particular node, which has a longer total spent-time length than those of any other AS paths, as a normal-state path (i.e., a single reference path). In the example of FIG. 2C, for the managed node AS70, the AS path

[10 20 40 60 70] is selected as the normal-state path, which has a maximum total spent-time length of "240 hours."

The observer node AS10 then determines, for each of other source nodes, one of AS paths used by each source node, as a single normal-state path (which is obtained when the path is assumedly in a normal state), using the AS paths (AS_PATH Attribute) contained in one or more UPDATE messages sent from each source node, such that the single normal-state path is included in (or is matched with a fraction of) the normal-state path for a manage node (e.g., the managed node AS70).

In the path table illustrated in FIG. 2C, some of the initially-stored AS paths are removed from the path table (denoted by strikethrough), which are not included in the normal-state path for the managed node AS70.

(S25) The observer node AS10 extracts inter-node links from the normal-state path for the prefix of a managed node. The extracted links is referred to as "monitored links."

In the example of FIG. 2C, inter-node links are extracted from the normal-state path [10 20 40 60 70] for the prefix "p7" of the managed node AS70, as illustrated in FIG. 2C. Eventually, links [10-20], [20-40], [40-60] and [60-70] are extracted for the normal-state path [10 20 40 60 70], as monitored links.

The observer node AS10 then determines, for each of the extracted links (i.e., the monitored links), at least one prefix which was advertised from one of the nodes that is adjacent to each link on an upstream side (or from one of two nodes with which each link is connected, the one being located on an upstream side), as at least one monitored prefix. In the present embodiment, monitored links and monitored prefixes are associated with each other, on a per-link basis.

Each of the monitored links corresponds to at least one monitored prefix, and a total number of the at least one monitored prefix for each monitored link is referred to as "per-link total monitored-prefix number."

In the example of FIG. 2C, for the monitored link [60-70], the prefix "p7" which was advertised from the node AS70 that is located immediately upstream of the link [60-70], is determined as a monitored prefix. For the monitored link [60-70], the per-link total monitored-prefix number is "1."

For the monitored link [40-60], the prefixes "p6," "p61," "p62," "p63" and "p64" which were advertised from the node AS60 that is located immediately upstream of the link [40-60], are each determined as a monitored prefix. For the monitored link [40-60], the per-link total monitored-prefix number is "5."

For the monitored link [20-40], the prefix "p4" which was advertised from the node AS40 that is located immediately upstream of the link [20-40], is determined as a monitored prefix. For the monitored link [20-40], the per-link total monitored-prefix number "1."

For the monitored link [10-20], the prefix "p2" which was advertised from the node AS20 that is located immediately upstream of the link [10-20], is determined as a monitored prefix. For the monitored link [10-20], the per-link total monitored-prefix number is "1."

Figure 3A:
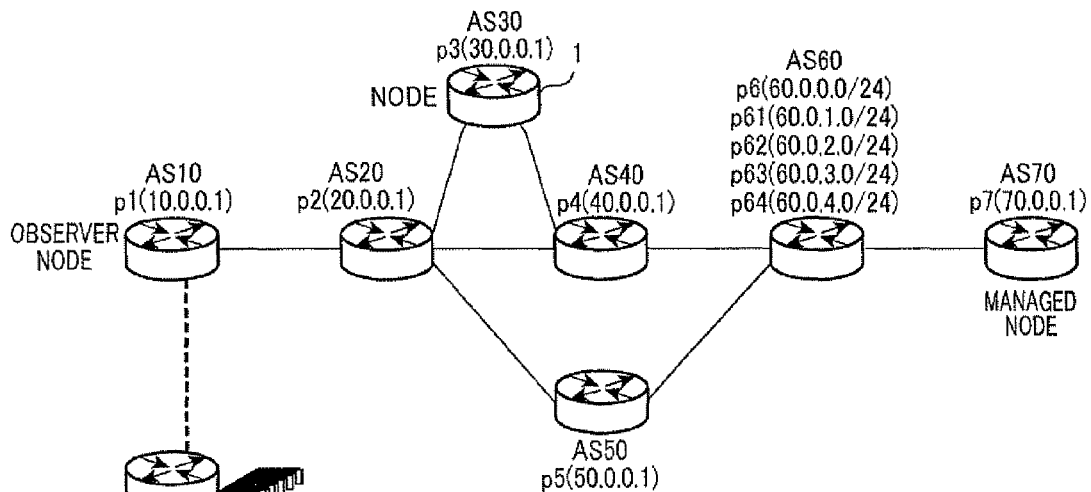
FIG. 3A is a view for illustrating the network depicted in FIG. 2A.
Figures 3B, 3C:
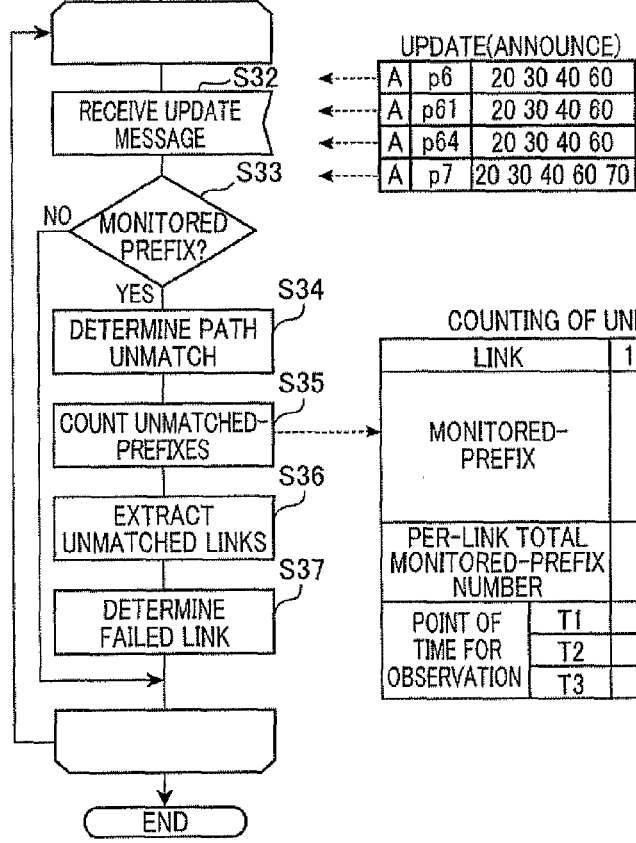
FIG. 3B is a flow chart for illustrating another program executed by the processor using the memory for implementing the method.
FIG. 3C is a view for illustrating tables for implementing the method.

FIG. 3A illustrates the same network as in FIG. 2A, FIG. 3B illustrates in flow chart a second portion of the real-time failure detection method which is implemented at the observer node AS10, and FIG. 3C illustrates tables for use in implementation of the second portion of the real-time failure detection method. The second portion of the method is executed in parallel with the first portion of the method illustrated in FIG. 2S.

Processing performed at the observer node AS10 will be described with reference to a flow chart of FIG. 3B.

(S31) The observer node AS10, each time it receives an UPDATE (Announce) message, detects a failed link, by repeating execution of the following steps S32-S37.

(S32) The observer node AS10 receives a BGP UPDATE (Announce) message, and extracts a prefix and an AS path from the received UPDATE message.

(S33) The observer node AS10 determines whether the received prefix is one of the previously-determined monitored-prefixes. If the received prefix is not any one of the monitored prefixes, then the observer node AS10 terminates the following processing, and waits for a new UPDATE (Announce) message to be received. This allows the observer node AS10 to execute the following steps S34-S37 only for the monitored prefixes (to be exact, the received prefixes that fall within the monitored prefixes).

(S34) The observer node AS10 determines, for each of the monitored links of a normal-state path for a managed node (e.g., the managed mode AS70), whether the AS path contained in the received UPDATE message is unmatched with the normal-state path for the prefix (i.e., one of the monitored prefixes) contained in the current UPDATE message.

(S35) Based on the result of the step S34, the observer node AS10 counts up, for each of the monitored links of the normal-state path for the managed node AS70, an unmatched-prefix count by the number of at least one unmatched prefix of one or more monitored prefixes for a managed node (e.g., the managed node AS70). The at least one unmatched prefix is different from the AS path of the received UPDATE message.

More specifically, the at least one unmatched prefix, for each monitored link, occurs, when the received UPDATE message which contains the same prefix as the at least one unmatched prefix does not contain the same link as the each monitored link.

(S36) The observer node AS10 determines, for each of the monitored links of the normal-state path for the managed node AS70, whether the corresponding unmatched-prefix count reaches the per-link total monitored-prefix number which corresponds to each monitored link (i.e., which are to be advertised by one of the nodes adjacent immediately to each monitored link on an upstream side).

As a result, the observer node AS10 extracts, as at least one failed-link candidate, at least one of the monitored links which has the corresponding unmatched-prefix count reaching the corresponding per-link total monitored-prefix number.

(S37) The observer node AS10 then determines a failed link (a final failed-link), such that, if the number is the at least one failed-link candidate amounts to "1," then the one failed-link candidate is determined as a failed link, while, if the number is the at least one failed-link candidate amounts to "2" or more, then one of the two or more failed-link candidates which is closer to the observer node AS10 on the normal-state path for the managed node AS70, than any other failed-link candidate(s), is determined as a failed link.

FIG. 4A illustrates the processing performed by the steps S34-S37 for the example of FIG. 2C which is also illustrated in FIG. 3C. FIG. 4A illustrates the same scenario as in FIGS. 2C and 3C.

In this example, the node AS60 advertises five (5) prefixes "p6," "p61," "p62," "p63" and "p64," with the result that the per-link total monitored-prefix number of the monitored link [40-60] amounts to "5." FIG. 4A illustrates a scenario in which the unmatched-prefix count for the monitored link [40-60] reaches "5." For the monitored link [40-60], the unmatched-prefix count equals to the per-link total monitored-prefix number, with the result that the monitored link [40-60] is extracted as a failed-link candidate.

In addition, the node AS70 advertises one (1) prefix "p7," with the result that the per-link total monitored-prefix number of the monitored link [60-70] amounts to "1." FIG. 4A illustrates a scenario in which the unmatched-prefix count for the monitored link [60-70] reaches "1." For the monitored link [60-70], the unmatched-prefix count equals to the per-link total monitored-prefix number, with the result that the monitored link [60-70] is extracted as another failed-link candidate.

In this scenario, the observer node AS10 determines the failed-link candidate [40-60] as a final or true failed-link, because the failed-link candidate [40-60] is closer to the observer node AS10 on the normal-state path than the failed-link candidate [60-70].

As will be evident from the foregoing, the present embodiment would allow at least one of the monitored links to be detected as a failed-link candidate, if, for the at least one link, the unmatched-prefix count reaches the per-link total monitored-prefix number.

Second Illustrative Embodiment

Referring next to FIG. 4B, a second illustrative embodiment of the present invention will be described. FIG. 4B illustrates a different scenario from those in FIGS. 2C, 3C and 4A.

In this embodiment of FIG. 4B, the observer node AS10 extracts as a failed link, at least one of the monitored links which has a prefix difference ratio of not less than a predetermined threshold ratio. The prefix difference ratio is defined as:

Prefix difference ratio=Unmatched-prefix count/Per-link total monitored-prefix number.

In an example of FIG. 4B, it is presupposed that, for the monitored link [40-60], three (3) prefixes "p61," "p63" and "p64" which have been advertised from the node AS60, are used to count up the unmatched-prefix count. In this scenario, for the monitored link [40-60], the prefix difference ratio is calculated as:

Prefix difference ratio=Unmatched-prefix count (=3)/Per-link total monitored-prefix number(=5)= 60%.

When the predetermined threshold ratio is set to 50%, the monitored link [40-60], if its unmatched-prefix count reaches "3," is determined as a failed-link candidate. In the case of the predetermined threshold ratio of 50%, the monitored link [60-70], if its unmatched-prefix count reaches "1," is determined as another failed-link candidate.

In this scenario, the observer node AS10 determines the failed-link candidate [40-60] as a true failed-link, because the failed-link candidate [40-60] is closer to the observer node AS10 on the normal-state path than the failed-link candidate [60-70].

It is added that the prefix difference ratio may be used as a failure occurrence probability which is defined as:

Failure occurrence probability=Unmatched-prefix count/Per-link total monitored-prefix number.

In an example where the monitored links [40-60] and [60-70] are each determined as a failed-link candidate, the observer node AS10 determines the failed-link candidate [40-60] as a true failed-link, with its failure occurrence probability of 60%.

FIGS. 5, 6A, 6B, 7, 8A and 8B illustrates another scenario of BGP network routing on the same network illustrated as in FIG. 2A.

Figure 5:
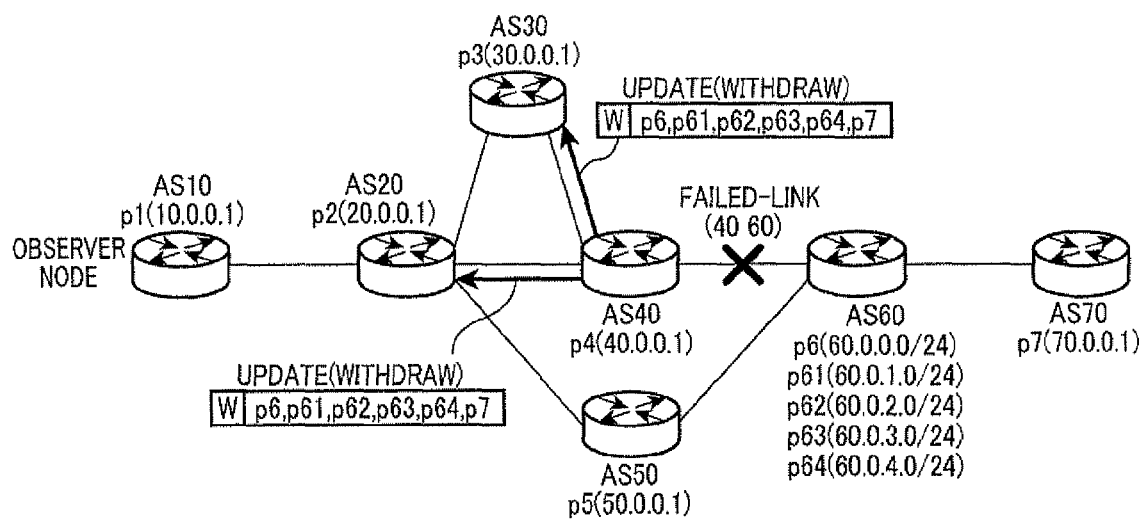
FIG. 5 is a view for illustrating a network for which the second embodiment is implemented and how to process an UPDATE (Withdraw) message in the second embodiment.

As illustrated in FIG. 5, it is presupposed that a failure occurs at the link [40-60] interposed between the nodes AS60 and AS40. The node AS40, on detecting a link failure, sends the following BGP UPDATE (Withdraw) message to the nodes AS20 and AS30:

UPDATE (Withdraw): [W|p6, p61, p62, p63, p64, p7].

The UPDATE (Withdraw) message is sent to withdraw particular links that are no longer available. The UPDATE (Withdraw) message contains the same prefixes as those in previous UPDATE messages. The previous UPDATE messages were sent to the node AS40 via the link [40-60], and were relayed or transferred to the neighbors by the node AS40. As such, the UPDATE (Withdraw) message contains the prefixes p6, p61, p62, p63, p64 and p7.

Figures 6A, 6B:
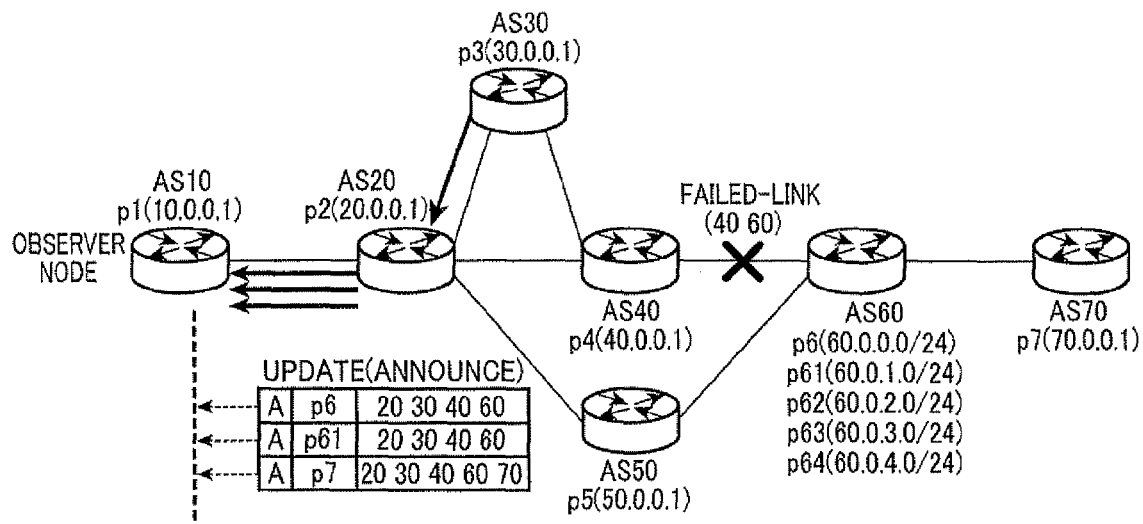
FIG. 6A is a view for illustrating the network depicted in FIG. 5 and how to process an UPDATE (Announce) message in the second embodiment.
FIG. 6B is a view for illustrating how to detect a failed link in the second embodiment.

As illustrated in FIG. 6A, the node AS20 receives the above-described UPDATE (Withdraw) message [W|p6, p61, p62, p63, p64, p7] from the node AS40. The node AS20, in turn, attempts to find one or more other available paths to the nodes corresponding to the prefixes p6, p61, p62, p63, p64 and p7. It is presupposed that, as a result of the attempt, the node AS20 has found the possibility that the nodes corresponding to the prefixes p6, p61, p62, p63, p64 and p7 can be reached via the node AS30. The reason is that the node AS20 has not extended its coverage to the failure at the link [40-60]. In this case, the node AS20 sends to the node AS10, the following new UPDATE (Announce) messages for the prefixes p6, p61, p62, p63, p64 and p7:

UPDATE (Announce): [A|p6|20 30 40 60 70],
UPDATE (Announce): [A|p6|20 30 40 60 70],
UPDATE (Announce): [A|p62|20 30 40 60 70],
UPDATE (Announce): [A|p63|20 30 40 60 70],
UPDATE (Announce): [A|p64|20 30 40 60 70], and
UPDATE (Announce): [A|p7|20 30 40 60 70].

As a result, the node AS10 comes to recognize that the path via the node AS30 to the nodes corresponding to the prefixes p6, p61, p62, p63, p64 and p7 has been ensured.

Actually, even the path via the node AS30 cannot avoid the failure at the inter-node link [40-60], within a route between the managed node AS70 and the observer node AS10.

As illustrated in FIG. 6B, it is presupposed that the observer node AS10 received the following UPDATE (Announce) messages, at an observation point of time T:

UPDATE (Announce): [A|p6|20 30 40 60 70],
UPDATE (Announce): [A|p61|20 30 40 60 70], and
UPDATE (Announce): [A|p7|20 30 40 60 70].

As illustrated in FIG. 6B, it is presupposed that the observer node AS10 calculates the unmatched-prefix count to indicate that there are two prefixes p6 and p61 that were advertised from the node AS60. In this case, the prefix difference ratio is calculated as follows:

Prefix difference ratio=unmatched-prefix count(=2)/Per-link total monitored-prefix number(=5)=40%

When the threshold ratio is set to 50%, the link [40-60], if its unmatched-prefix count reaches "2" which indicates there are two monitored prefixes that were not advertised (i.e., when the prefix difference ratio reaches 40%), is not determined as a failed-link candidate. Under the same threshold ratio, the link [60-70], if its unmatched-prefix count reaches "1" (i.e., when the prefix difference ratio reaches 100%), is determined as a failed-link candidate.

Figure 7:
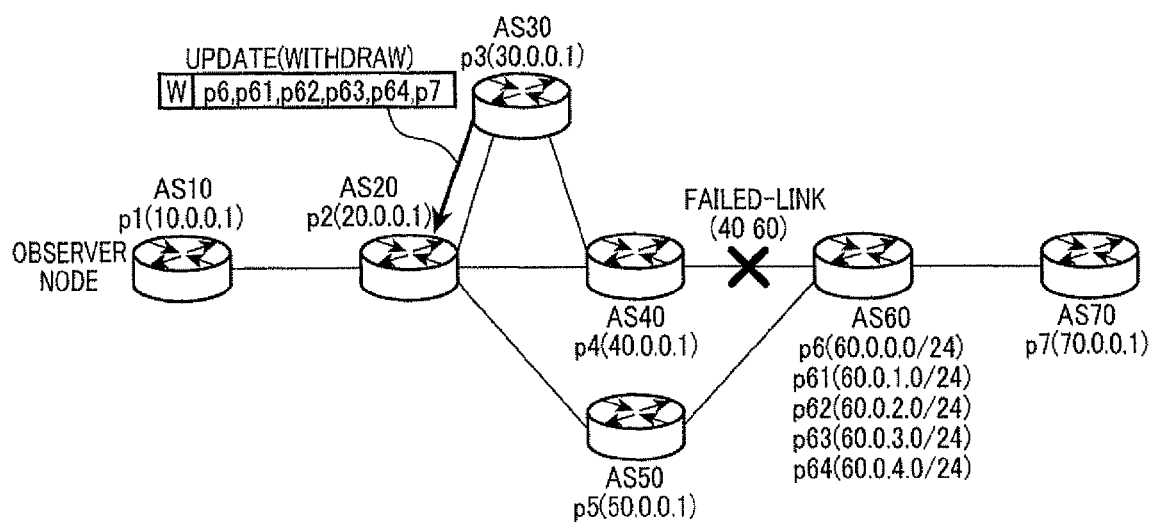
FIG. 7 is a view for illustrating the network depicted in FIG. 6A and how to process an UPDATE (Withdraw) message in the second embodiment.

As illustrated in FIG. 7, following the scenario of FIG. 5, the node AS30 sends the above-described UPDATE (Withdraw) message [W|p6, p61, p62, p63, p64, p7] to the node AS20. As illustrated in FIG. 5, the node AS30 had received the UPDATE (Withdraw) message [W|p6, p61, p62, p63, p64, p7] from the node AS40. The node AS30 cannot find any other available paths to the prefixes p6, p61, p62, p63, p64 and p7. Then, the node AS30 transfers the UPDATE (Withdraw) message [W|p6, p61, p62, p63, p64, p7] to the node AS20.

As illustrated in FIG. 8, the node AS20, after receiving the above-described UPDATE (Withdraw) message [W|p6, p61, p62, p63, p64, p7] from the node AS30, recognizes that even the path via the node AS30 to the prefixes p6, p61, p62, p63, p64 and p7 would not avoid the link failure occurring at the link [40 60]. The node AS20, then, attempts to find one or more other available paths to the nodes corresponding to the prefixes p6, p61, p62, p63, p64 and p7. It is presupposed that, as a result of the attempt, the node AS20 has found the possibility that the nodes corresponding to the prefixes p6, p61, p62, p63, p64 and p7 can be reached via the node AS50. In this case, the node AS20 sends to the node AS10, the following new UPDATE (Announce) messages for the prefixes p6, p61, p62, p63, p64 and p7:

UPDATE (Announce): [A|p6|20 50 60 70],
UPDATE (Announce): [A|p61|20 50 60 70],
UPDATE (Announce): [A|p62|20 50 60 70],
UPDATE (Announce): [A|p63|20 50 60 70],
UPDATE (Announce): [A|p64|20 50 60 70], and
UPDATE (Announce): [A|p7|20 50 60 70].

As a result, the node AS10 comes to recognize that the path via the node AS50 to the nodes corresponding to the prefixes p6, p61, p62, p63, p64 and p7 has been ensured.

Figures 8A, 8B:
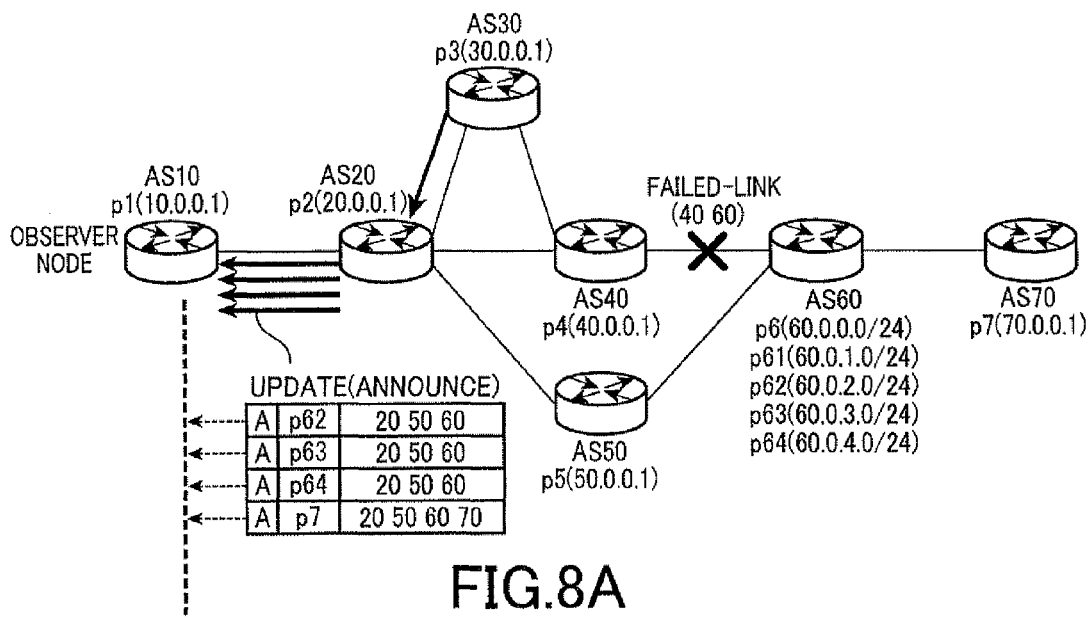
FIG. 8A is a view for illustrating the network depicted in FIG. 7 and how to process an UPDATE (Announce) message in the second embodiment.
FIG. 8B is a view for illustrating how to detect a failed link in the second embodiment.

As illustrated in FIG. 8B, it is presupposed that the observer node AS10 received the following UPDATE (Announce) messages, at an observation point of time T:

UPDATE (Announce): [A|p62|20 50 60 70],
UPDATE (Announce): [A|p63|20 50 60 70],
UPDATE (Announce): [A|p64|20 50 60 70], and
UPDATE (Announce): [A|p7|20 30 40 60 70].

As illustrated in FIG. 8B, it is presupposed that the observer node AS10 calculates the unmatched-prefix count to indicate that there are three prefixes p62, p63 and p64 that were advertised from the node AS60. In this case, the prefix difference ratio is calculated as follows:

Prefix difference ratio=unmatched-prefix count(=3)/
Per-link total monitored-prefix number(=5)=60%

When the threshold ratio is set to 50%, the link [40-60], if its unmatched-prefix count reaches "3" which indicates there are three monitored prefixes that were not advertised (i.e., when the prefix difference ratio reaches 60%), is determined as a failed-link candidate. Under the same threshold ratio, the link [60-70], if its unmatched-prefix count reaches "1" (i.e., when the prefix difference ratio reaches 100%), is also determined as a failed-link candidate.

As will be evident from the foregoing, the present embodiment would allow at least one of the monitored links to be detected as a failed-link candidate with a minimum error rate, even if, for the at least one monitored link, the unmatched-prefix count and the per-link total monitored-prefix number are equal to each other.

[System Configuration]

Figure 9:
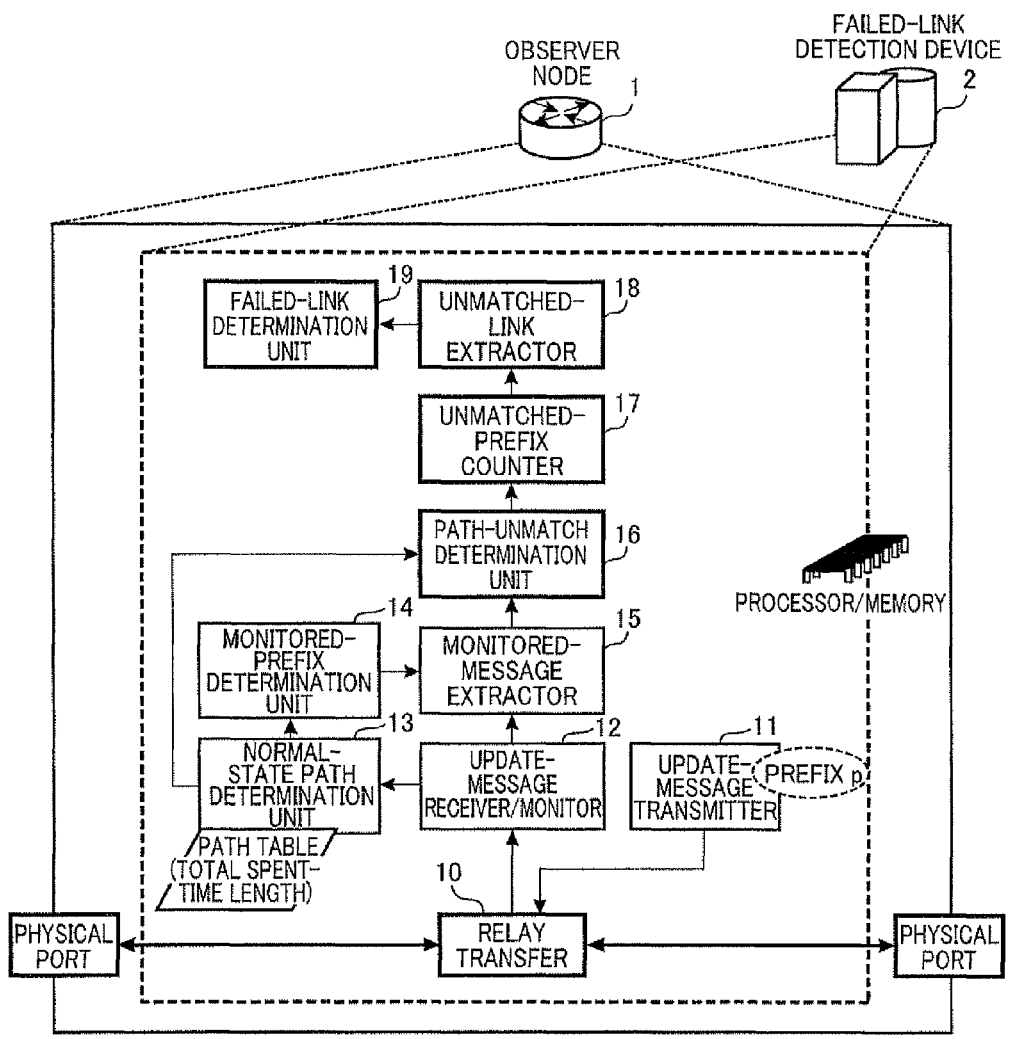
FIG. 9 is a functional block diagram illustrating an observer node depicted in FIG. 2A.

Referring next to FIG. 9, there is illustrated in functional block diagram the configuration of the observer node 1 (i.e., denoted also as AS10 in the previous drawings) which is used in common to the real-time locating methods according to the first and second embodiments of the invention.

As illustrated in FIG. 9, the observer node 1 is configured to include: a relay transfer 10; an UPDATE-message transmitter 11; an UPDATE-message receiver/monitor 12; a normal-state path determination unit 13; a monitored-prefix determination unit 14; a monitored-message extractor 15; a path-unmatch determination unit 16; an unmatched-prefix counter 17, an unmatched-link extractor 18 and a failed-link determination unit 19.

The functions of these components are provided by causing a processor using a memory to execute a program mounted on the observer node 1.

These components except the relay transfer 10 may be mounted on a failed-link detection device 2 which has previously stored therein information on a history of transfer of UPDATE messages. The nodes other than the observer node 1, as illustrated in FIG. 2A, are configured to include the same components as the relay transfer 10, the UPDATE-message transmitter 11, and the UPDATE-message receiver/monitor 12 of the observer node 1.

The relay transfer 10 is configured to, upon reception of an UPDATE (Announce) message from the neighbors, transfer to the other neighbors, the received UPDATE (Announce) message after adding the AS number of the observer node AS10 to the path represented by a sequence of AS numbers of intervening nodes, wherein the path is contained in the received UPDATE (Announce) message.

The UPDATE-message transmitter 11 is configured to repeatedly transmit to the neighbors, a new UPDATE message containing the prefix and the AS number of the observer node AS10, in a broadcast manner, according to BGP.

The UPDATE-message receiver/monitor 12 is configured to, upon extraction of BGP UPDATE messages from the relay transfer 10, deliver the extracted UPDATE messages to the normal-state path determination unit 13 and the monitored-message extractor 15.

The normal-state path determination unit 13 is configured to determine, for each of the prefixes assigned to the other nodes which are contained in the received UPDATE (Announce) messages, one of paths contained in the received UPDATE (Announce) messages, as a normal-state path when the one path is assumedly in a normal state, using the paths contained in the received UPDATE (Announce) messages.

More specifically, the normal-state path determination unit 13 is configured to, for each prefix assigned to each node, calculate and store, total spent-time lengths of AS paths contained in the received UPDATE messages, for the respective prefixes of the nodes contained in the received UPDATE messages. Each total spent-time length indicates a total length of one or more time periods during which the same AS path was used within a predetermined time range. This operation forms in-part the step S23 illustrated in FIG. 2B.

The normal-state path determination unit 13 is further configured to select, for a prefix of a particular node (e.g., the managed node AS70), one of AS paths that were used by the particular node, which has a longer total spent-time length than those of any other AS path(s), as a normal-state path (i.e., a single reference path). This operation forms in-part the step S23 illustrated in FIG. 2B.

The normal-state path determination unit 13 is still further configured to determine, for each node, one of AS paths used by each node, as a single normal-state path (which is obtained when the path is assumedly in a normal state), using the AS paths (AS_PATH Attribute) contained in one or more UPDATE messages sent from each node, such that the single normal-state path is included in (or is matched with a fraction of) the normal-state path for a manage node (e.g., the managed node AS70). This operation forms the step S24 illustrated in FIG. 2B.

The thus-determined normal-state paths for the nodes including the above-mentioned particular node are delivered to the monitored-prefix determination unit 14.

The monitored-prefix determination unit 14 is configured to extract inter-node links from the normal-state path for the prefix of the managed node AS70, and then determine, for each of the extracted links, at least one prefix which was advertised from one of the nodes that is adjacent to each link on an upstream side (or from one of two nodes with which each link is connected, that is located on an upstream side), as at least one monitored prefix. This operation forms the step S25 illustrated in FIG. 2B.

The monitored-message extractor 15 is configured to extract ones of received UPDATE massages which contain the monitored prefixes, and deliver only the extracted UPDATE messages to the path-unmatch determination unit 16. This operation forms the step S33 illustrated in FIG. 3B.

The path-unmatch determination unit 16 is configured to determine, for each of the monitored links of the normal-state path for the managed mode AS70, whether the AS path contained in the UPDATE message received from the monitored-message extractor 15 is unmatched with the normal-state path for the prefix (i.e., one of the monitored prefixes) contained in the current UPDATE message. This operation forms the step S34 illustrated in FIG. 3B.

The unmatched-prefix counter 17 is configured to count up, for each of the monitored links of the normal-state path for the managed node AS70, the unmatched-prefix count by the number of the at least one unmatched prefix of one or more monitored prefixes for the managed node AS70. The at least one unmatched prefix is different from the AS path of the received UPDATE message. This operation forms the step S35 illustrated in FIG. 3B.

The unmatched-link extractor 18 is configured to determine, for each of the monitored links of the normal-state path for the managed node AS70, whether the corresponding unmatched-prefix count reaches the per-link total monitored-prefix number which corresponds to each monitored link (i.e., which are to be advertised by one of the nodes adjacent immediately to each monitored link on an upstream side). As a result, the unmatched-link extractor 18 extracts, as at least one failed-link candidate, at least one of the monitored links which has the corresponding unmatched-prefix count reaching the corresponding per-link total monitored-prefix number. This operation forms the step S36 illustrated in FIG. 3B.

The failed-link extractor 18 is configured to determine a failed link (a final failed-link), such that, if the number is the at least one failed-link candidate amounts to "1," then the one failed-link candidate is determined as a failed link, while, if the number is the at least one failed-link candidate amounts to "2" or more, then one of the two or more failed-link candidates which is closer to the observer node AS10 on the normal-state path for the managed node AS70, than any other failed-link candidate(s), is determined as a failed link. This operation forms the step S37 illustrated in FIG. 3B.

As will be evident from the foregoing, the illustrative embodiments described above, while keeping track of UPDATE messages according to BGP, in a conventional or unmodified sequence, allow the location of a failed link to be estimated based on per-link differences in terms of the prefixes between the normal-state path and actually used paths, soon after an actual link-failure occurs, without requiring waiting for the network routing to be completely converged.

Reference throughout the specification to "one embodiment" or "an embodiment" means that a particular feature, structure, or characteristic described in connection with the embodiment is included in at least one embodiment of the present invention.

Thus, the appearance of the phrases "in one embodiment" or "in an embodiment" in various places throughout the specification are not necessarily all referring to the same embodiment. Furthermore, the particular features, structures, or characteristics may be combined in any suitable manner in one or more embodiments.

Moreover, inventive aspects lie in less than all features of a single disclosed embodiment. Thus, the claims following the Detailed Description are hereby expressly incorporated into this Detailed Description, with each claim standing on its own as a separate embodiment of this invention.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. A method of detecting a failed link in a network where multiple nodes are connected with one another via inter-node links, wherein the nodes send/receive route-update messages to their neighbors, in accordance with a pre-selected routing protocol, each node sends in a broadcast manner, a route-update message containing a prefix and a unique node number of the each node, each node, upon receiving a route-update message, transfers the received route-update message after adding the unique node number of the each node to a path represented by a sequence of unique node numbers contained in the received route-update message, wherein the path was used for the same route-update message to be transferred to the each node, and one of the nodes is selected as an observer node, and another is selected as a managed node, the method is implemented for the observer node, the method comprising:

a first step of determining, for the prefix of the managed node, a single normal-state path which it is in a normal state, out of the paths contained in the received route-update messages containing the same prefix;

a second step of determining, for each of the links on the normal-state path determined for the prefix of the managed node, at least one prefix advertised from one of the nodes which is located adjacent to the each link on an upstream side, as at least one monitored prefix, wherein the links on the normal-state path determined for the prefix of the managed node are referred to as monitored links, each of the monitored links corresponds to at least one monitored prefix, and a total number of the at least one monitored prefix for each monitored link is referred to as a per-link total monitored-prefix number;

a third step of selecting ones of the received route-update messages which contain the monitored prefixes determined for the nodes;

a fourth step of determining, for each of the selected route-update messages, whether the path contained in the each selected route-update message is unmatched with the normal-state path determined for the monitored prefix contained in the each selected route-update message;

a fifth step of counting, for each of the monitored links, an unmatched-prefix count which refers to a count of at least one unmatched prefix of the at least one monitored prefix for the each monitored link, wherein the at least one unmatched prefix occurs when at least one of the selected route-update messages which contains the same prefix as the at least one unmatched prefix does not contain the same link as the each monitored link;

a sixth step of extracting at least one link from the monitored links, as at least one failed link, based on a relationship between the unmatched-prefix count and the per-link total monitored-prefix number for the at least one monitored link; and a seventh step of determining, when a count of the extracted at least one failed link is two or more, one of the extracted two or more failed links, which is closer to the observer node on the normal-state path determined for the managed node, than any other failed link or links.

2. The method according to claim 1, wherein the sixth step includes a sub-step of extracting at least one of the monitored links, which has a prefix-difference ratio equal to or higher than a predetermined ratio, as the at least one failed link, wherein the prefix-difference ratio is defined as, Prefix-difference ratio=Unmatched-prefix count/Per-link total monitored-prefix number.

3. The method according to claim 2, wherein the seventh step includes a sub-step of determining that the extracted at least one failed link has a failure occurrence probability defined as, Failure occurrence probability=Unmatched-prefix count/Per-link total monitored-prefix number.

4. The method according to claim 1, wherein the first step includes a sub-step of calculating, for each prefix, total spent-time lengths of the paths contained in ones of the received UPDATE messages which contain the same prefix as the each prefix, and selecting, for each prefix, one of the paths which has a longer total spent-time length than any other path or paths, as the normal-state path, wherein each total spent-time length indicates a total length of one or more time periods during which the same path was used within a predetermined time range.

5. The method according to claim 1, wherein the routing protocol is BGP (Border Gateway Protocol), each unique node number is an AS (Autonomous System) number, each route-update message is a BGP UPDATE (Announce) message, each prefix indicates a source address or its domain in a combination of an IP address and a bit count of a subnet mask of each node, and the path for each prefix is contained in an AS_PATH Attribute of one of the UPDATE messages which contains the each prefix.

6. A computer-readable non-transitory storage medium having stored therein a program, when executed by a computer, to implement the method according to claim 1.

7. An apparatus for detecting a failed link in a network where multiple nodes are connected with one another via inter-node links, wherein the nodes send/receive route-update messages to their neighbors, in accordance with a pre-selected routing protocol, each node sends in a broadcast manner, a route-update message containing a prefix and a unique node number of the each node, each node, upon receiving a route-update message, transfers the received route-update message after adding the unique node number of the each node to a path represented by a sequence of unique node numbers contained in the received route-update message, wherein the path was used for the same route-update message to be transferred to the each node, and one of the nodes is selected as an observer node, and another is selected as a managed node, the apparatus is implemented for the observer node, the apparatus comprising:

a normal-state path determination unit configured to determine, for the prefix of the managed node, a single normal-state path which it is in a normal state, out of the paths contained in the received route-update messages containing the same prefix;

a monitored-prefix determination unit configured to determine, for each of the links on the normal-state path determined for the prefix of the managed node, at least one prefix advertised from one of the nodes which is located adjacent to the each link on an upstream side, as at least one monitored prefix, wherein the links on the normal-state path determined for the prefix of the managed node are referred to as monitored links, each of the monitored links corresponds to at least one monitored prefix, and a total number of the at least one monitored prefix for each monitored link is referred to as a per-link total monitored-prefix number;

a monitored-message extractor configured to select ones of the received route-update messages which contain the monitored prefixes determined for the nodes;

a path-unmatch determination unit configured to determine, for each of the selected route-update messages, whether the path contained in the each selected route-update message is unmatched with the normal-state path determined for the monitored prefix contained in the each selected route-update message;

an unmatched-prefix counter configured to count, for each of the monitored links, an unmatched-prefix count which refers to a count of at least one unmatched prefix of the at least one monitored prefix for the each monitored link, wherein the at least one unmatched prefix occurs when at least one of the selected route-update messages which contains the same prefix as the at least one unmatched prefix does not contain the same link as the each monitored link;

an unmatched-link extractor configured to extract at least one link from the monitored links, as at least one failed link, based on a relationship between the unmatched-prefix count and the per-link total monitored-prefix number for the at least one monitored link; and a failed-link determination unit configured to determine, when a count of the extracted at least one failed link is two or more, one of the extracted two or more failed links, which is closer to the observer node on the normal-state path determined for the managed node, than any other failed link or links.

8. The apparatus according to claim 7, wherein the unmatched-link extractor includes a sub-extractor for extracting at least one of the monitored links, which has a prefix-difference ratio equal to or higher than a predetermined ratio, as the at least one failed link, wherein the prefix-difference ratio is defined as, Prefix-difference ratio=Unmatched-prefix count/Per-link total monitored-prefix number.

9. The apparatus according to claim 8, wherein the failed-link determination unit includes a sub-unit for determining that the extracted at least one failed link has a failure occurrence probability defined as, $$\text{Failure occurrence probability} = \text{Unmatched-prefix count} / \text{Per-link total monitored-prefix number}.$$

10. The apparatus according to claim 7, wherein the normal-state path determination unit includes a sub-unit for calculating, for each prefix, total spent-time lengths of the paths contained in ones of the received UPDATE messages which contain the same prefix as the each prefix, and selecting, for each prefix, one of the paths which has a longer total spent-time length than any other path or paths, as the normal-state path, wherein each total spent-time length indicates a total length of one or more time periods during which the same path was used within a predetermined time range.

11. The apparatus according to claim 7, wherein the routing protocol is BGP (Border Gateway Protocol), each unique node number is an AS (Autonomous System) number, each route-update message is a BGP UPDATE (Announce) message, each prefix indicates a source address or its domain in a combination of an IP address and a bit count of a subnet mask of each node, and the path for each prefix is contained in an AS_PATH Attribute of one of the UPDATE messages which contains the each prefix.

* * * * *